United States Patent [19]

Rau et al.

[11] 4,368,846
[45] Jan. 18, 1983

[54] MELTING BURNER MADE OF VITREOUS SILICA FOR THE PRODUCTION OF MASSIVE VITREOUS SILICA

[75] Inventors: Karlheinz Rau, Hanau; Horst Lorenz, Buchköbel; Oswald Huth; Lothar Volkmann, both of Hanau; Kurt Stenzel, Oberursel, all of Fed. Rep. of Germany

[73] Assignee: Heraeus Quarzschmelze GmbH, Hanau, Fed. Rep. of Germany

[21] Appl. No.: 214,860

[22] Filed: Dec. 10, 1980

[30] Foreign Application Priority Data

Dec. 22, 1979 [DE] Fed. Rep. of Germany ....... 2952038

[51] Int. Cl.³ .............................................. B05C 5/04
[52] U.S. Cl. .................................. 239/85; 239/427.5; 239/428; 239/433; 239/DIG. 19
[58] Field of Search .............. 239/DIG. 19, 85, 427.5, 239/428, 430, 433

[56] References Cited

U.S. PATENT DOCUMENTS 2,820,670  1/1958  Charlop et al. ...................... 239/85
3,644,743  2/1972  Binek et al. ..................... 239/428 X

OTHER PUBLICATIONS

Field Information Agency Technical Final Report No. 536, Office of Military Government for Germany, (U.S.), 1945, pp. 15-17.

Primary Examiner—Andres Kashnikow
Assistant Examiner—Paul A. Sobel
Attorney, Agent, or Firm—Sprung, Horn, Kramer & Woods

[57] ABSTRACT

Melting burner of vitreous silica for the production of massive vitreous silica by the melting of silicon dioxide particles. Propulsion jets fed with oxygen are surrounded by a plurality of oxygen-fed heating jets forming a ring. Oxygen flows around the propulsion jets and the heating jets. The front ends of the propulsion jets, which are overlapped by the front ends of the heating jets, are inclined towards the axis of the melting burner.

12 Claims, 6 Drawing Figures

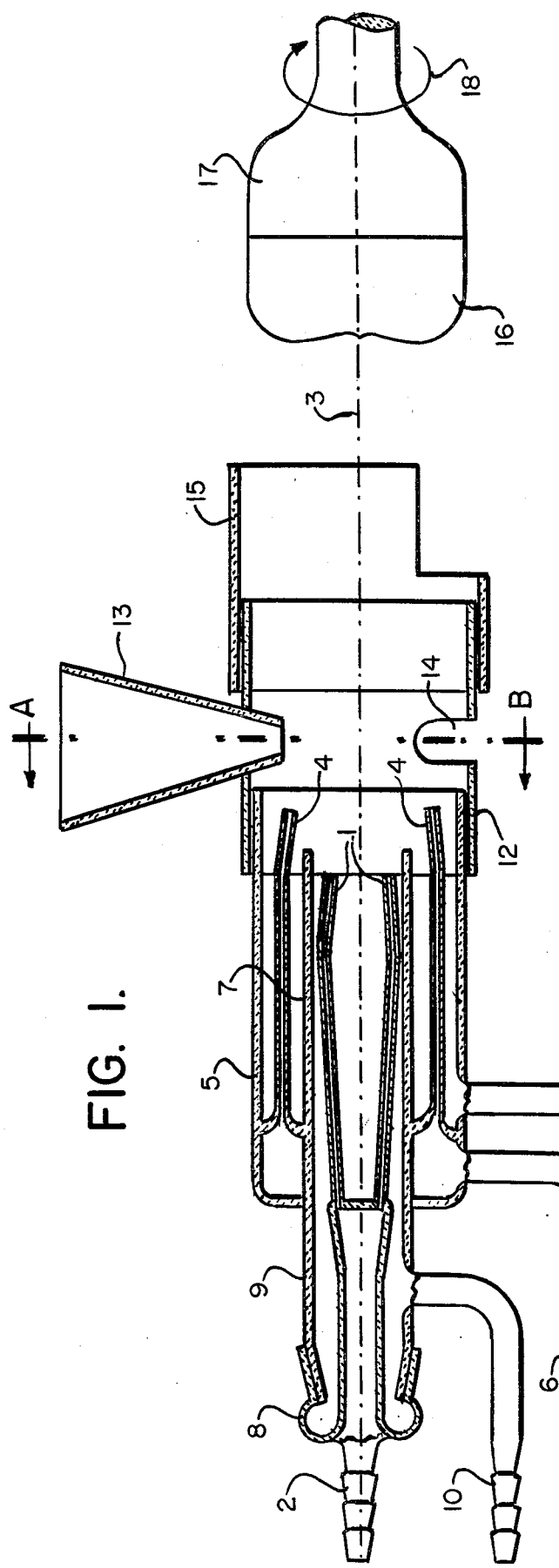
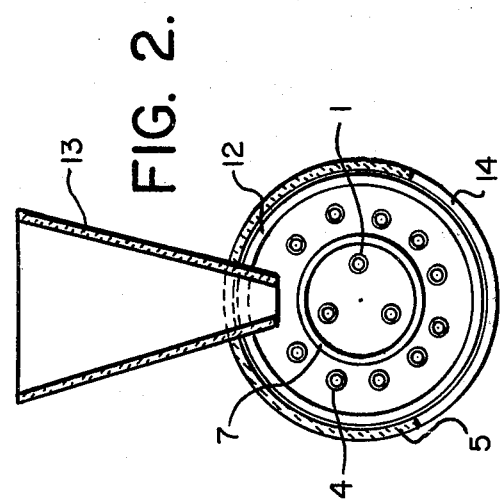

U.S. Patent  Jan. 18, 1983  Sheet 2 of 3  4,368,846
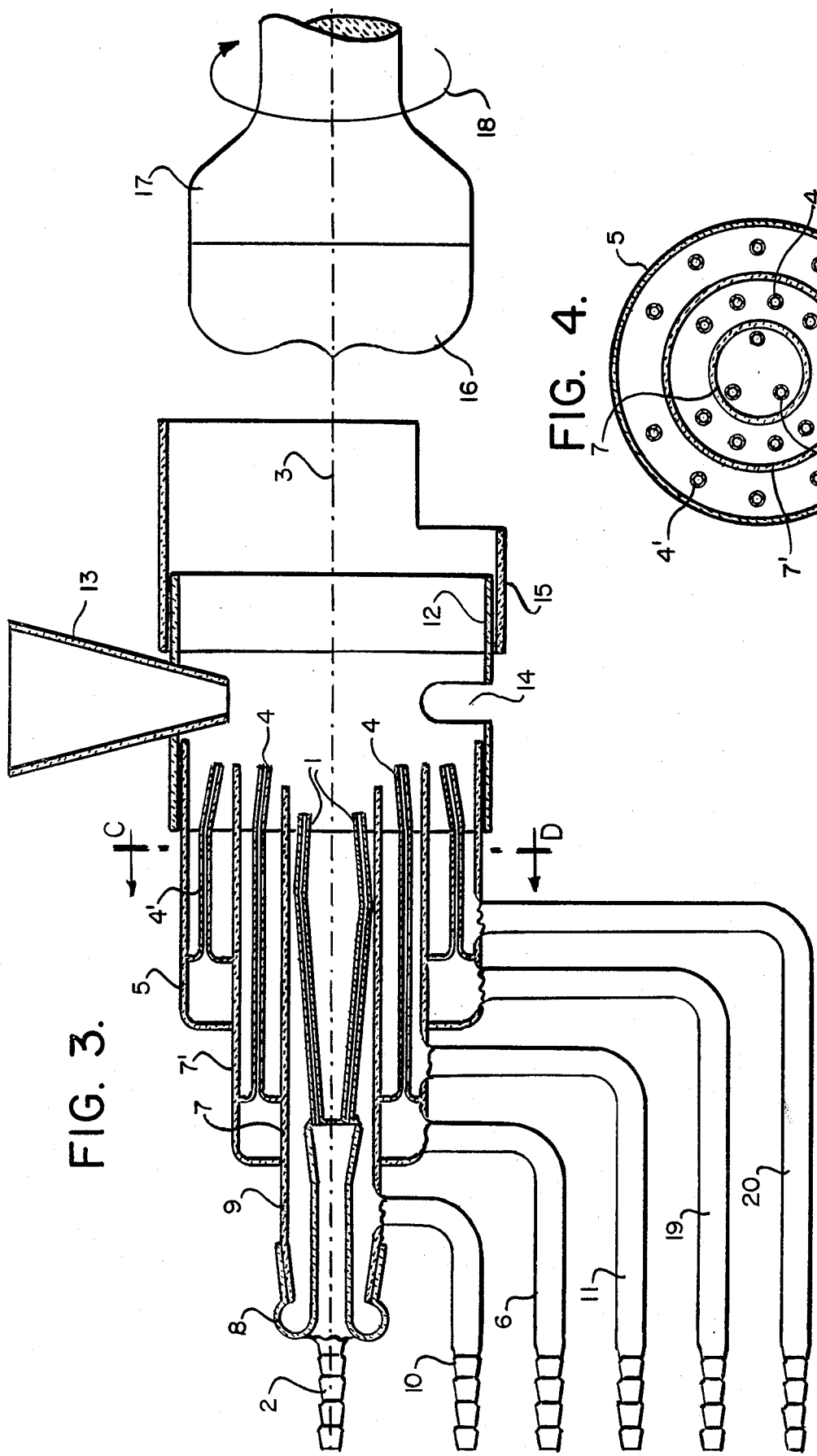
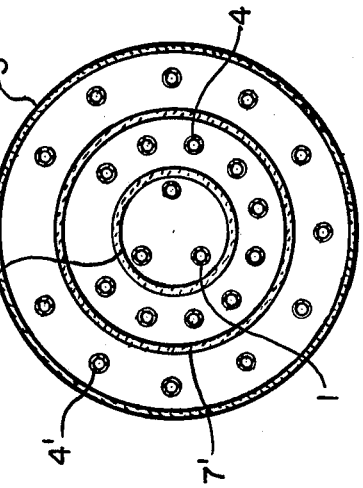

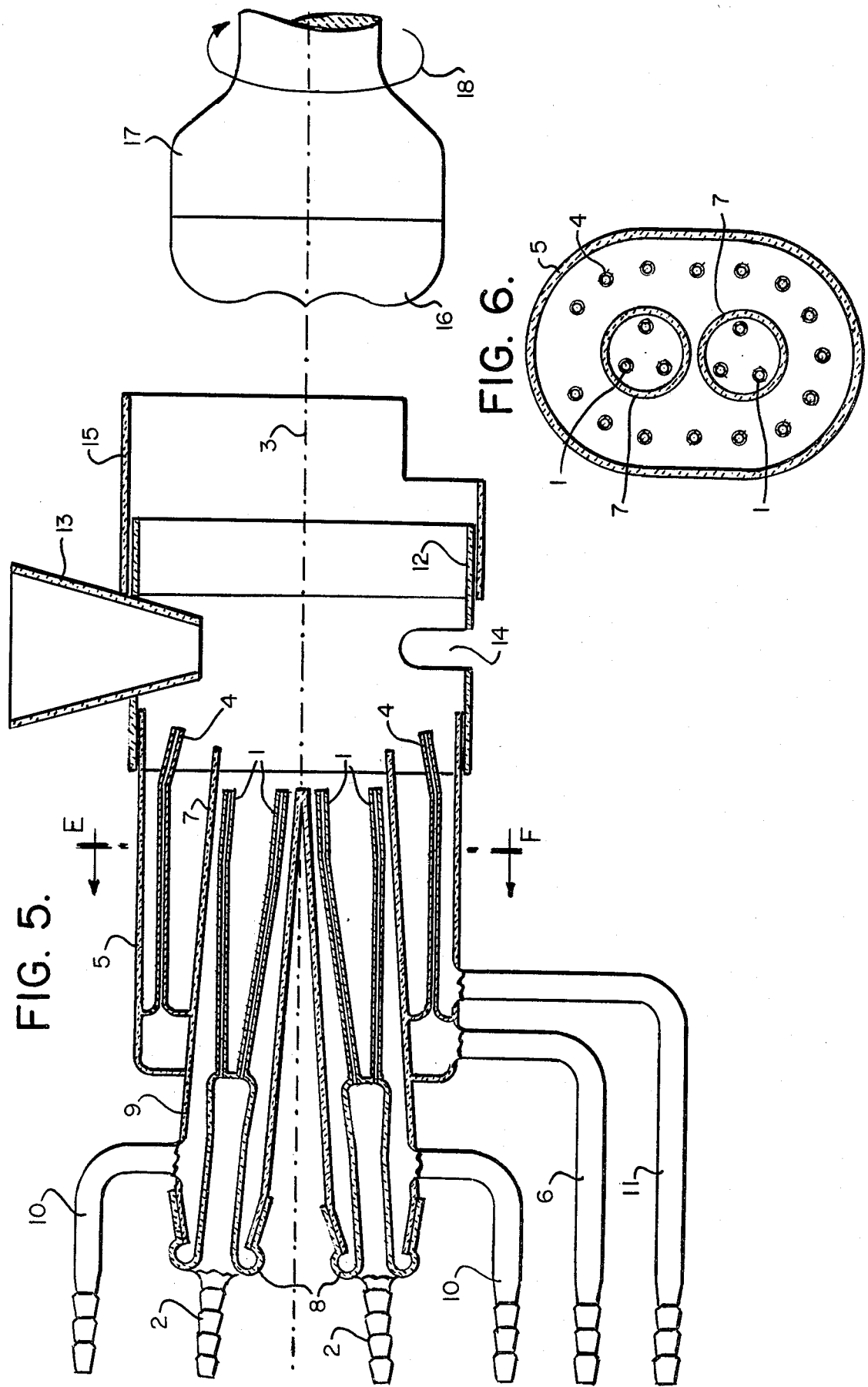

MELTING BURNER MADE OF VITREOUS SILICA FOR THE PRODUCTION OF MASSIVE VITREOUS SILICA

BACKGROUND OF THE INVENTION

1. Field of the Invention:

The invention relates to a melting burner of vitreous silica for the production of massive vitreous silica, having within a tubular jacket one or more oxygen-fed propulsion jets which are surrounded by a hydrogen stream and beyond whose extremeties the tubular jacket extends, the burner having a device for feeding silica particles disposed laterally on it, ahead of the propulsion jets as seen in the direction of flow of the gases.

2. Discussion of Prior Art:

Melting burners of the kind described above are disclosed in the FIAT (Field Information Agency, Technical) Final Report No. 536, page 16, in which a report is given on the melting burner used by Heraeus Quarzschmelze GmbH. These melting burners serve for melting fine silica particles in a hydrogen-oxygen flame and for deposition the molten particles on a target, thus producing a massive vitreous silica body. These melting burners have proven practical, because in this manner, foreign impurities of a metallic or metal oxide nature are prevented from becoming incorporated into the massive vitreous silica bodies. The known melting burners, however, permit no adaptation of the heat flow. Additionally, the transport of the silica particles to the point at which they are fused is deficient.

SUMMARY OF THE INVENTION

It is an object of the invention to provide a melting burner which is operable to build up massive vitreous silica bodies in a substantially economical manner. It is a further object to provide such a burner which builds up vitreous bodies more rapidly than before and which consumes energy at a minimum. These and other objects are provided by a melting apparatus in accordance with this invention, which is preferably made of vitreous silica, and is employed for the production of massive vitreous silica. The melting apparatus of this invention comprises a tubular jacket within which there is disposed at least one propulsion jet which is to be enveloped by a stream of hydrogen. The tubular jacket projects beyond the forward end of the propulsion jet. The apparatus comprises ahead of the forward end of the propulsion jet or jets and viewed in the direction of gas flow, a laterally disposed feeding device for feeding silica particles in the melting apparatus. The apparatus of the invention is improved by providing at least one propulsion jet which at its forward end is inclined toward the longitudinal axis of the tubular jet, is surrounded by a plurality of oxygen fed heating jets which form a jet jacket, such is in the shape of a ring, the discharge orifices of said heating jets projecting beyond the forward end of the propulsion jet or jets, the jet jacket in turn being surrounded by said tubular jacket. The space between the jet jacket and the tubular jacket and the space between the propulsion jet(s) and the jet jacket are in gaseous communication with a source of hydrogen. The propulsion jet(s) and the oxygen fed heating jets which form the jet jacket are in gaseous communication with a source of oxygen.

Preferably, the apparatus of this invention comprises a plurality of propulsion jets. The propulsion jets can be mounted on a common support which is rotatably set onto an extension of the tubular jacket 5.

There are several preferred embodiments of the invention as illustrated in the drawings. In one embodiment, there is provided a further series of oxygen-fed heating jets which further series form a second jet jacket. This second jet jacket has its individual oxygen fed heating jets disposed between the heating jets of the first jet jacket and the tubular jacket.

The space therebetween is in fluid communication with a source of hydrogen, the oxygen-fed heating jets of the second jet jacket being in fluid communication with the source of oxygen. The discharge orifices of the heating jets of the second jet jacket likewise project beyond the forward end of the propulsion jets.

The invention further contemplates in the case of a melt apparatus containing two sets of jet jackets the disposition in the space between such two jet jackets of a plurality of additional oxygen-fed jets. These additional oxygen-fed jets can be mounted on the support for the propulsion jets. Their discharge orifices project beyond the discharge orifices of the propulsion jets but not beyond the discharge orifices of the heating jets.

The apparatus is made, preferably, of vitreous silica. The heating jets themselves can be welded onto a support tube also made of vitreous silica.

While the jet jackets can have a variety of shapes in cross-section such as circular, elliptical, and the jet jackets can be rectilinear or curvilinear in configuration. It is preferred that the discharge orifices of the heating jets where there are a plurality of jet jackets be disposed in a single plane.

The apparatus is particularly effective for the formation of massive vitreous silica on a substrate or target disposed opposite the discharge end of the melting apparatus. The target or substrate can be mounted on a mounting means which rotates the same as the silica particles are fed through the feeding device and propelled in the form of vitreous silica onto the target or substrate.

BRIEF DESCRIPTION OF DRAWINGS

Additional advantageous improvements of the melting burner of the invention will be evident from the following disclosure wherein preferred embodiments of melting burners of the invention are described, particularly with reference to the drawings in which FIG. 1 is a vertical cross-section through a melting burner of the invention.

FIG. 2 is a cross-section taken along the plane A-B through the melting apparatus of FIG. 1, FIG. 3 is a vertical cross-section of another embodiment of a melting burner of the invention having a dual ring of heating jets;

FIG. 4 is a cross-section taken along plane C-D through the melting burner of FIG. 3;

FIG. 5 shows a vertical cross-section of an embodiment of a melting burner of the invention having two sets of propulsion jets;

FIG. 6 is a cross-section along the plane E-F of FIG. 5, showing another view of the apparatus.

DESCRIPTION OF SPECIFIC EMBODIMENTS

As can be seen in FIG. 1, the melting burner has a plurality of propulsion jets 1 which are fed with oxygen through the feed line 2. These propulsion jets are surrounded by a plurality of heating jets 4 arranged in a ring which in turn is enveloped by the tubular jacket 5.

The heating jets are fed with oxygen through the feed line 6. The propulsion jets and the heating jets are separated from one another by an intermediate tube 7. This tube 7 is fixedly joined to the tubular jacket 5.

The propulsion jets 1 are fastened to a common support 8 which is rotatably placed on an extension 9 of the tubular jacket 5. Hydrogen flows through the connecting line 10 and thence through the space between the propulsion jets 1 and the intermediate tube 7 during operation. Hydrogen also flows via connecting tube 11 into the space between the intermediate tube 7 and the tubular jacket 5, i.e. the space in which the heating jets are disposed.

As is also seen in FIG. 1, the forward end of the propulsion jets 1 is inclined towards the axis 3 of the tubular jacket. The orifices of the heating jets 4 project beyond the forward end of the propulsion jets.

A mounting tube 12 is pushed over the tubular jacket, as seen in the direction of flow of the gases, and a feeder 13 for feeding fine silica particles, whose orifice extends into the mounting tube is disposed in the tube 12. Instead of the mounting tube 12, the tubular jacket 5 can be prolonged, so that the silica particle feeding means is inserted into the tubular jacket and thus the orifice of the feeder 13 extends into the tubular jacket. On its side opposite the feeder, the mounting tube 12 has an air intake aperture 14, or, if the tubular jacket 5 is prolonged, this jacket has the air intake aperture 14. The aperture serves to allow the fine silica particles which fail to be caught by the oxygen stream from the propulsion jets nozzles 1 to drop through the mounting tube or jacket, as the case may be, thereby reducing the danger of the clogging of the melting burner with fine silica particles.

During the operation of the melting burner, air is aspirated through the aperture 14, which advantageously cools the lower part of the mounting tube 12 or prolonged jacket 5 to such an extent that silica particles which are not struck by the flames, but do not fall through the air aspirating aperture 14, and instead settle on the inner surface between the aperture 14 and the end of the melting burner, will not adhere to the vitreous silica of the mounting tube or jacket tube. The silica particles that settle there are largely swept by the flow of the air aspirated through the aperture to the end of the melting burner, where they can be caught after they emerge from the melting burner. The air aspiration aperture not only has the advantages described, but it thereby assures a completely continuous operation of the melting burner. In the known melting burner, the melting process has also had to be interrupted from time to time. In many cases, it was even necessary to replace the melting burner with a new one, because it is frequently clogged with silica particles which have fused together between the feeding means and the front end of the burner.

If desired, one can, as represented in FIG. 1, place a concentrating tube 15 on the mounting tube 12 or prolonged jacket 5, so as to serve mainly for concentrating the total flame on the vitreous silica mass that is formed on a target 17 which likewise consists of transparent or opaque vitreous silica. The target 17 is rotated during the production of the solid vitreous silica mass, as indicated by arrow 18.

During the operation of the melting apparatus, the oxygen-fed propulsion jets serve, in addition to their heating action, to propel to the fusion point the silica particles delivered through the feeder 13. The point of fusion is the end of the mass 16 facing the melting burner. The oxygen is for this purpose delivered at a relatively high velocity through the propulsion jets, while the hydrogen fuel gas flows around the propulsion jets at a comparatively low velocity.

As previously explained, the propulsion jets are fastened to a support 8 which is mounted rotatably on the jacket tube prolongation, and thus permits the groups of flames from the propulsion jets to be adjusted for the attainment of an optimum transport of the silica particles.

The thermal energy additionally required for the fusion of the silica particles is produced by the group of flames from the heating jets. As indicated in FIG. 2, the heating jets surround the groups of flames from the propulsion jets, and this permits the attainment of optimum fusion conditions from a thermal point of view. The groups of flames from the heating jets are also diffusion flames, the same as the groups of flames from the propulsion jets, the oxygen again flowing at relatively high velocity through the heating jets and the hydrogen fuel gas flowing at a low velocity in comparison thereto, within the space between the jacket 5 and the intermediate tube 7.

The front end of the heating jets is also advantageously inclined toward the axis of the tubular jacket, which, like the inclination of the front end of the propulsion jets, counteracts the natural spreading out of the overall structure of the flames.

The melting burner represented in Figure and in cross-section in FIG. 4 differs from the one represented in FIG. 1 substantially in that, in addition to the heating jets 4, an additional group 4' of heating jets forming an additional ring is provided. The heating jet group 4 and the heating jet group 4' are separated from one another by an additional vitreous silica intermediate tube 7'. The heating jet group 4' is supplied with oxygen through the feed line 19. The interval between the tubular jacket 5 and the additional intermediate tube 7' is fed through the connecting line 20 with hydrogen which therefore flows around the heating jet group 4'. This construction of a melting burner permits an optimation quantum of energy for the production of a solid mass of glass.

The additional embodiment of a melting burner of the invention represented in FIG. 5 and in cross-section in FIG. 6 has, unlike the melting burner of FIG. 1, a dual group of propulsion jets, which is surrounded by a single ring formed by the heating jets 4. This embodiment effects still further reduction of the transport losses of silica particles between the feeder and the point of fusion, i.e., the open confronting face of the mass 16.

With a melting burner of the invention, a glass mass is produced in the manner described below.

The melting burner of vitreous silica is disposed in a conventional oven casing with a combustion gas flue such that the tubular jacket axis 3 is substantially horizontal. The flame end of the melting burner, that is the end from which the flames emerge during operation, is aimed at the face of a rotatable target 17 at a distance therefrom. The axis of rotation of the target 17 and the tubular jacket axis virtually coincide. After the ignition of the flames, the following approximate gas velocities are established in the case of the melting burner represented in FIG. 1:

| | |
|---|---|
| Oxygen for the propulsion jets | 3.8 Nm³/h |

| -continued | |
|---|---|
| Oxygen for the heating jets | 2.0 Nm³/h |
| Hydrogen enveloping the propulsion jets | 10.0 Nm³/h |
| Hydrogen enveloping the heater jets | 5.8 Nm³/h |
| Total gas flow | 21.8 Nm³/h |

First, the face of the rotating target is heated by the flames to the melting temperature. Then fine silica particles having a grain size ranging from 0.01 to 2.5 mm, is fed into the flame at a controlled rate, say 2800 g/h. The propellent flames seize the individual silica particles, heat them, and transport them or hurl them like bullets against the face of the rotating target which is at the melting temperature. There the greatly heated particles are fused together to form a massive vitreous silica body. During the melting process, the target 17 is gradually moved away from the melting burner as the amount of vitreous silica built up on it increases, so that the face is always at the same distance from the front end of the melting burner. The formation of the glass mass, i.e., its built-up, takes place continuously until the mass reaches the desired length. It is possible, under the conditions described above, to build up approximately 2.5 kilograms of vitreous silica per hour. This is an amount that is about 70% greater than the amount that can be built up with the known melting burners at the same total rate of flow of gas.

What is claimed is:

1. In a melting apparatus for the production of massive vitreous silica comprising a tubular jacket within which is disposed at least one propulsion jet which is to be enveloped by a stream of hydrogen, said tubular jacket projecting beyond the forward end of said propulsion jet, said apparatus further comprising, ahead of the forward end of the propulsion jet, and viewed in the direction of gas flow, a laterally disposed feeding device for feeding silica particles into said apparatus, the improvement wherein said propulsion jet, at least at its forward end, is inclined toward the tubular jacket axis, is surrounded by a plurality of oxygen fed heating jets which form a jet jacket, said heating jets having discharge orifices, said discharge orifices projecting beyond the forward end of said propulsion jet, said jet jacket in turn being surrounded by said tubular jacket, the space between said jet jacket and said tubular jacket and the space between said propulsion jet and said jet jacket being in gaseous communication with the source of hydrogen and said heating jets and said propulsion jet being in gaseous communication with a source of oxygen.

2. A melting apparatus according to claim 1, wherein there are a plurality of propulsion jets, the forward ends of which are inclined toward the tubular jacket axis, said plurality of propulsion jets being surrounded by the plurality of heating jets.

3. A melting apparatus according to claim 2, wherein said propulsion jets are mounted on a common support which is rotatably set onto an extension of said tubular jacket.

4. A melting apparatus according to claim 2, further comprising a second jet jacket formed by a plurality of oxygen-fed heating jackets disposed between said jet jacket and said tubular jacket, the space between said second jacket and said tubular jacket being in fluid communication with a source of hydrogen, the heating jets of said second jet jacket being in fluid communication with a source of oxygen, the discharge orifices of the jets of said second jet jacket projecting beyond the forward end of said propulsion jets.

5. A melting apparatus according to claim 4, wherein there is disposed in the space between the two jet jackets a plurality of additional oxygen-fed jets which are mounted on a support for said propulsion jets whose discharge orifices project beyond the discharge orifices of said propulsion jets but not beyond the discharge orifices of said heating jets.

6. A melting apparatus according to claim 1, wherein the apparatus is made of vitreous silica.

7. A melting apparatus according to claim 3, wherein said heating jets are welded onto a support tube made of vitreous silica.

8. A melting apparatus according to claim 4, wherein said discharge orifices of the heating jets of the second jet jacket are disposed in one plane.

9. A melting apparatus according to claim 1, wherein the discharge opening of the feeding device projects into said tubular jacket or into a mounting tube slipped onto said tubular jacket.

10. An apparatus according to claim 1, wherein said tubular jacket is provided with an air intake aperture on the side opposite the feeding device.

11. A melting apparatus according to claim 1, wherein said device comprises a mounting tube and on said mounting tube there is disposed an air intake aperture on a side of the apparatus opposite the feeding device.

12. A melting apparatus according to claim 1, wherein there are a plurality of propulsion jets fed by separate lines in communication with a source of oxygen, said separate lines also feeding jets disposed within said propulsion jets whose orifices are not inclined toward said tubular jacket axis, the ends of said jets not projecting beyond the discharge orifices of said heating jets.

* * * * *